(12) United States Patent
Kablaoui et al.

(10) Patent No.: US 7,109,604 B2
(45) Date of Patent: Sep. 19, 2006

(54) DEVICE FOR DISTRIBUTING ELECTRICAL ENERGY AND METHOD FOR MONITORING THE DISTRIBUTION OF ENERGY

(75) Inventors: Hassan Kablaoui, Pfullingen (DE); Juergen Mittnacht, Grafenau (DE)

(73) Assignee: DaimlerChrysler AG, Stuttgart (DE)

( * ) Notice: Subject to any disclaimer, the term of this patent is extended or adjusted under 35 U.S.C. 154(b) by 387 days.

(21) Appl. No.: 10/386,111

(22) Filed: Mar. 12, 2003

(65) Prior Publication Data
US 2004/0000909 A1  Jan. 1, 2004

(30) Foreign Application Priority Data
Mar. 12, 2002 (DE) ................. 102 10 665

(51) Int. Cl.
*H02J 3/00* (2006.01)
*H02J 1/00* (2006.01)
*H02G 3/00* (2006.01)
*H02M 1/10* (2006.01)

(52) U.S. Cl. .................. 307/31; 307/10.1; 307/11; 307/29; 307/30; 307/38

(58) Field of Classification Search .................. 307/9.1, 307/10.1, 11, 147, 3.1, 31, 29, 38, 115, 126, 307/154; 361/704; 701/22
See application file for complete search history.

(56) References Cited

U.S. PATENT DOCUMENTS

| | | | |
|---|---|---|---|
| 4,144,463 A * | 3/1979 | Sugiura | 307/75 |
| 6,369,460 B1 * | 4/2002 | Endoh et al. | 307/31 |
| 6,373,671 B1 * | 4/2002 | Watanabe et al. | 361/93.8 |
| 6,380,638 B1 * | 4/2002 | Bitsche et al. | 290/40 C |
| 6,577,025 B1 * | 6/2003 | Hentschel et al. | 307/10.1 |
| 6,611,066 B1 * | 8/2003 | Onizuka et al. | 307/9.1 |
| 6,724,627 B1 * | 4/2004 | Onizuka et al. | 361/704 |
| 6,792,341 B1 * | 9/2004 | Hunt et al. | 701/22 |
| 2003/0137193 A1 * | 7/2003 | Belschner et al. | 307/9.1 |
| 2003/0222506 A1 * | 12/2003 | Otani et al. | 307/86 |
| 2004/0113662 A1 * | 6/2004 | Grimsrud | 327/78 |

FOREIGN PATENT DOCUMENTS

WO  99/46140  9/1999

* cited by examiner

Primary Examiner—Lynn Feild
Assistant Examiner—Michael Rutland-Wallis
(74) Attorney, Agent, or Firm—Crowell & Moring LLP

(57) ABSTRACT

A device having an energy-generating unit and a distributor unit for distributing electrical energy to electrical loads. The electrical loads are connected to connector part halves of the distributor unit. Connector part halves, arranged at the load ends of the lines, are connected to connector part halves of the loads. The connector part halves which are connected to the lines have line bridges which serve to close or open a line section of a diagnostic circuit. A switching means is actuated by means of a control unit and is arranged between the energy-generating unit and the distributor unit. A signal generator and an evaluation unit are assigned to the diagnostic circuit. The invention also relates to a method for monitoring the diagnostic circuit.

12 Claims, 1 Drawing Sheet

DEVICE FOR DISTRIBUTING ELECTRICAL ENERGY AND METHOD FOR MONITORING THE DISTRIBUTION OF ENERGY

BACKGROUND AND SUMMARY OF THE INVENTION

This application claims the priority of German Application No. 102 10 665.7-35, filed Mar. 12, 2002, the disclosure of which is expressly incorporated by reference herein.

The invention relates to a device having an energy-generating unit and a distributor unit for distributing electrical energy to electrical loads and a method for monitoring the distribution of energy.

The international application WO 99/46140 A1 discloses a hybrid drive for an electric vehicle, which drive has a fuel cell, an energy store, an electric locomotion motor and electric secondary loads. A distributor unit is provided which includes two separate circuits provided with switching devices for optionally connecting the electric locomotion motor and the electric secondary loads to the fuel cell or the energy store. The distributor unit also has a switchable connecting line between the fuel cell and the energy store.

In high-voltage networks, distributor units for distributing electrical energy over flexible lines, for example cables, are connected to electrical loads. The lines usually have connector part halves or plug-type connectors at their ends. These connector part halves/plug-type connectors correspond to connector part halves/plug-type connectors provided at or in housings of the distributor unit or the loads and are detachably connected to them. An example of a stationary distributor unit of this type is a switching cabinet. In transportation devices, the lines are frequently arranged in cable housings and are connected to or into the housings of the loads and of the distributor unit with their associated connector part halves during installation. If necessary, the connector part halves can be separated from one another, for example during maintenance or repair work, and connected to one another again.

In order to ensure that, when a connector part composed of two connected connector part halves is opened, for example by removing a load or pulling off one connector part half, there is no voltage at the connector part half of the distributor unit or of the line which is now exposed, a line loop or a diagnostic circuit, which runs through the connector part halves (and is referred to as interlock), is typically provided. When two connector part halves are separated, the diagnostic circuit is disconnected. This disconnection triggers a disconnection of the current supply or voltage supply of the distributor unit, making the connector part halves current free. This ensures that persons and surroundings are not put at risk by high voltages and that arcing does not occur.

If the separation of two connector part halves is considered as a fault of the normal operating state, this specific type of fault which is associated with a disconnection of the diagnostic circuit or the line loop, is detected by just this disconnection of the diagnostic circuit. However, in the arrangement described at the beginning other faults may occur which can lead to persons and surroundings being put at risk.

For example, short-circuits may occur between the connector part and earth or supply voltage. Other faults may occur in the form of no-load operation, in particular at or in the connector part. In the previously described device, these faults are not detected as they are not associated with a separation of two connector part halves and the associated disconnection of the diagnostic circuit.

The present invention is based on the object of taking measures which detect faults and prevent people and surroundings from being put at risk in a device with an energy-generating unit and a distributor unit for distributing electrical energy to electrical loads. The object of the invention is also to provide a method for monitoring a device which is embodied in this way.

The invention is characterized by the use and the monitoring of defined diagnostic signals in the diagnostic circuit and/or on the conductor loop. This measure can easily be integrated into existing devices for distributing electrical energy to loads. The expenditure on components and the amount of insulation space required are low. Faults which change the time profile of diagnostic signals in a relevant fashion are detected and lead to the current supply or voltage supply of the distributor unit, and thus of the loads, being switched off.

If the diagnostic signal is transmitted, for example to an evaluation unit assigned to a load, even though the diagnostic circuit is separated or disconnected, for example as a result of two connected connector part halves being separated, a fault is detected due to the changed curve shape of the time profile of the diagnostic signal. Furthermore, the current supply or voltage supply of the distributor unit is interrupted, and the safety of persons and the environment is thus ensured.

Other objects, advantages and novel features of the present invention will become apparent from the following detailed description of the invention when considered in conjunction with the accompanying drawings.

BRIEF DESCRIPTION OF THE DRAWINGS

Further advantageous refinements of the invention emerge from the subclaims and from the exemplary embodiments which are illustrated below by reference to the drawing.

The single figure shows a device according to the invention for distributing electrical energy to electrical loads.

DETAILED DESCRIPTION OF THE PREFERRED EMBODIMENT

Figure 1:
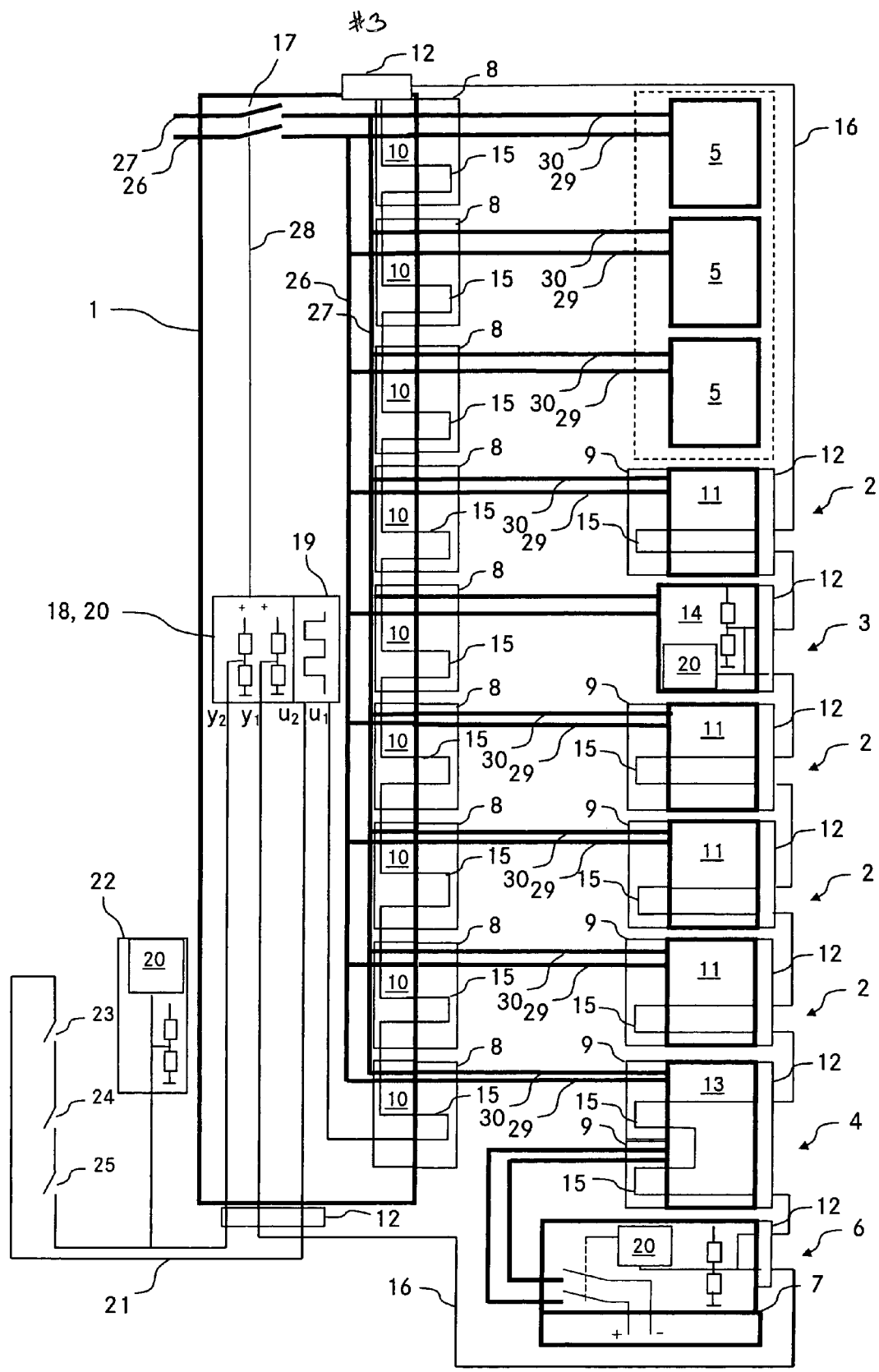

The single figure illustrates a distributor unit 1 which is used to distribute electrical energy to electrical loads 2, 3, 4, 5, 6, 7. The load 4 may be, for example, a DC voltage/DC voltage converter, and the load 6 may be an energy management system, and the load 7 an energy store which can itself be used to supply energy. The distributor unit 1 is supplied with electrical energy from an energy supply unit (not illustrated) via the lines 26, 27 which are provided with a switching means 17. The lines 26, 27 are at different potentials, the line 26 being preferably at positive potential and the line 27 at negative potential. The lines 26, 27 are preferably medium-voltage lines. The lines 26, 27 may also be embodied as high-voltage lines. Electrical loads 2, 3, 4, 5 are connected to the lines 26, 27 via lines 29, 30 and line branches or lines which are not designated in more detail. The distributor unit 1 has connector part halves 10 for the connection of loads 2, 3, 4, 5 via lines. It goes without saying that other connector part halves can be used for connecting additional loads (not illustrated). Branches or line branches which are not designated in more detail branch off from the lines 26, 27 with two branches being provided for each load to be connected. These line branches pass through the connector part halves 10 in pairs. The lines 29, 30 have a connector part half 8 at the distributor unit end, and a connector part half 9 at the load end. The connector part half 8 of the lines 29, 30 corresponds to the connector part half 10 of the distributor unit 1. If these connector part halves 8, 10 are connected to one another or closed, the line branches (not designated in more detail) of the distributor unit 1 are connected to the lines 29, 30 and current flows into the lines 29, 30 when the switching means 17 is closed. The switching means 17 is advantageously embodied as a switch-disconnector or power switch. In the opened state of the switching means 17, the line branches (not designated in more detail) are preferably electrically isolated from the energy-generating unit (not illustrated).

The loads 2, 4 have a connector part half (not designated in more detail) for connecting the connector part halves 9 of the lines 29, 30. The connector part halves of the loads 2, 3, 4, 6 are advantageously part of an electronic printed circuit board 11, 13 and are not separately identified as such.

A line loop or a diagnostic circuit 16 runs through the connector part halves 10 of the distributor unit 1, the connector part halves of the loads 2, 3, 4, 6 and the connector part halves 8, 9 of the lines 29, 30. When two connector part halves 8, 10 are opened or a connector part half 9 is disconnected from a load 2, 4, diagnostic circuit 16 is interrupted when a line section 15, embodied as a line bridge, of the diagnostic circuit 16 is disconnected. The line bridge 15 is provided in the connector part halves 8, 9 of the lines 29, 30. The diagnostic circuit 16 is preferably supplied with electrical energy by a low-volt voltage source (not illustrated). When the device is used in a means of transportation it is advantageous to supply electrical energy by means of an on-board power system. The distributor unit 1 and the loads have connecting points 12 for the connection of sections (not designated in more detail) of the diagnostic circuit 16. The connecting points 12 are preferably low-voltage connecting points.

Loads 3 can also be connected to the distributor unit 1 via lines (not designated in more detail) which have only one distributor-unit-end connecting part half 8. This is the case in particular if no load-end connector part half 9 or some other type of connection is required owing to the particular type of load 3. In the exemplary embodiment illustrated in the single figure, the load 3 is preferably an electrical drive unit with converter unit or drive unit which is used in a hybrid and/or fuel cell vehicle for driving the vehicle.

The loads 2, 3, 4, 5, 6, 7 are only indicated in the single figure or illustrated schematically. The loads 2 are represented in particular by means of a printed circuit board 11 with integrated connector part (not designated in more detail) and a connecting point 12. The loads 5 are illustrated purely schematically and serve only for clarification of the fact that the number of loads which can be supplied with electrical energy by the distributor unit 1 can exceed the number of loads illustrated in the single figure. The load-end connector part halves 9 which are required depending on the type of loads 5 are omitted from the loads 5 for the sake of simplicity.

According to the invention, a defined or predetermined signal $u_1$ is fed into the diagnostic circuit 16 by means of a signal generator 19. The signal $u_1$ is preferably an encoded signal, in particular a pulse-width-modulated signal. The signal $u_1$ is monitored by means of an evaluation unit 20 which is arranged in the diagnostic circuit 16. Further evaluation units 20 are preferably arranged at a plurality of locations on, or sections of the diagnostic circuit 16. The monitoring can be carried out by calculating or estimating or measuring. It is preferably carried out here by measuring.

The signal generator 19 is preferably integrated in the distributor unit 1. The distributor unit 1 is also preferably provided with a control unit 18 and an evaluation unit 20. The control unit 18 and the evaluation unit 20 may be embodied as one physical unit and integrated in a housing. Furthermore, evaluation units 20 are preferably arranged in or on the active components of the loads which are connected, or can be connected, to the distributor unit 1. The active loads include, for example, control units or control devices and converters, for example a fuel tank control device 22, drive electronics of an electrical machine 3, a battery management system 6, a DC voltage/DC voltage converter 4. The evaluation unit 20 of the DC voltage/DC voltage converter 4 is not illustrated for reasons of clarity. Of course, the diagnostic unit 16 runs through these components and is operatively connected to the evaluation units 20.

The evaluation units 20 determine a measured and/or calculated value $y_1$ of the diagnostic signal $u_1$. The value $y_1$ is also referred to below as measured value $y_1$. The evaluation units 20 compare the original diagnostic signal $u_1$ with the measured value $y_1$ and determine a deviation. If the measured value $y_1$ differs from the original diagnostic signal $u_1$ and if this deviation exceeds a predetermined tolerance threshold, an error or a fault is diagnosed. The deviation may, for example, consist in the fact that a difference from the standards for the diagnostic signal $u_1$ and measured value $y_1$ exceeds a threshold value. The deviation can also consist in the fact that the time profile of the measured value $y_1$ differs significantly from the time profile of the original signal $u_1$. If the original signal $u_1$ is a pulse-width-modulated signal with predetermined pulse width, a fault is detected if the pulse width changes in such a way that a change in the pulse width in a tolerance range is exceeded or undershot.

In one particularly preferred embodiment, the pulse-width-modulated signal $u_1$ has a change in sign at each sudden change. If the time profile of the measured value $y_1$ does not contain a change in sign within a specific time interval, the evaluation units 20 detect a fault.

Changes in the signal are detected by monitoring the signal in the diagnostic circuit 16. Specific changes (for example upward transgression of a threshold value, changes corresponding to predefined deviations) lead to a fault state being diagnosed. In this way, it is detected if a connector part half 8, 9 of a line 29, 30 is separated from a connector part half 10 of a distributor unit 1 or of a load. In addition, short circuits to earth or to the supply voltage or no-load operation are detected. If, due to a fault or due to the opening of a connector part, the signal $u_1$ on, the conductor loop 16 were to change in such a way that a specific change occurs, this is detected and the measures for ensuring the safety of persons and the surroundings can be initiated.

If a fault is detected by an evaluation unit 20, a signal is transmitted to the control unit 18 via lines (not illustrated). This signal causes the control unit 18 to actuate and open the switching means 17 via a line 28. As a result of the opening of the switch 17, the distributor unit 1 is disconnected from the energy supply unit (not illustrated). The lines 29 and 30 and the connector part halves 8, 9, 10 and the connector part halves (not designated in more detail) of the loads 2, 3, 4, 5 thus become current free. The security of persons and surroundings is ensured.

The device according to the invention and the method according to the invention are preferably used in a fuel cell vehicle. The device according to the invention and the method according to the invention can also be used in a battery-operated vehicle. In a fuel cell vehicle, a fuel cell unit typically supplies the electrical energy for supplying energy to an electrical machine 3 as drive unit and to the other electrical loads located in a vehicle. Such loads are, for example, a compressor, an on-board power system, an on-board power system battery, an air-conditioning system, electromagnetically adjustable valves, and sensors. A fuel cell generates electrical energy from hydrogen and oxygen. The fuel cell usually obtains the oxygen from the surrounding air, while hydrogen is carried along in a hydrogen tank or can be obtained from fuel, for example methanol, or a hydrocarbon, for example diesel, by means of reforming or partial oxidation. It constitutes a high-voltage source of approximately 200–300 V. For the starting procedure, when the fuel cell unit is still in the warming-up phase, an energy store 7, for example a battery and/or a SuperCap, is usually used as the energy supplier in the starting phase. As illustrated in the single figure, the energy store 7 can be connected via lines (not designated in more detail) and a switching element (not designated in more detail) to a DC voltage/DC voltage converter 4 which is connected to the distributor unit 1 via lines 29, 30. The energy store 7 may, depending on the design of the DC voltage/DC voltage converter 4, be a high-voltage or low-voltage energy store. An energy management system 6 which is preferably connected to the DC voltage/DC voltage converter 4 via the same lines (not designated in more detail) is assigned to the energy store 7. The DC voltage/DC voltage converter 4 may have an evaluation unit 20 and a connecting plug 12 and be arranged in the diagnostic circuit 16. The energy management system 6 preferably has an evaluation unit 20 and is arranged in the diagnostic circuit 16. Furthermore, the energy management system 6 has a connecting plug 12 for connecting to the diagnostic circuit. If the evaluation unit 20 of the energy management system 6 discovers a fault, it actuates the switching means (not designated in more detail) which are assigned to the energy management system 6 and disconnects the energy store 7 from the energy supply. The actuation can be carried out by means of a control unit (not illustrated) or directly.

The signal generator 19 and the control unit 18 with an integrated evaluation unit 20 are preferably integrated in a vehicle control device.

A further diagnostic circuit 21, in which further, in particular safety-related switches, are arranged is advantageously provided in a fuel cell vehicle. These safety-related switches are usually connected to corresponding sensors via a bus system and via a control device. In the single figure, a hydrogen switch 23, which is connected to a sensor for detecting hydrogen, a crash switch 24 and a service switch 25 are provided in the diagnostic circuit 21 by way of example. The service switch 25 can be activated by the service, maintenance and repair personnel. If it is detected that an accident has occurred or hydrogen has escaped, the corresponding switch 23, 24 opens and the diagnostic circuit 21 is disconnected. A fuel tank control unit 22, to which an evaluation unit 20 is assigned, is preferably connected to the diagnostic circuit 21.

The diagnostic circuit 21 and the diagnostic circuit 16 preferably have the same energy supply source. The signal generator 19 also feeds a predefined, preferably a pulse-width-modulated signal $u_2$ into the diagnostic circuit 21. The diagnostic signal $u_2$ is monitored by measurement and/or calculation using the evaluation unit 20 of the fuel tank control device 22 and/or using the evaluation unit 20 which is assigned to the control unit 18. The value of the original signal $u_2$ which is determined by monitoring is also referred to as measured value $y_2$. In accordance with the diagnosis of faults in the diagnostic circuit 16, a fault is detected if the measured value $y_2$ deviates from the original signal $u_2$ in a specific way. If this is the case, a signal is transmitted to the control unit 18, said signal actuating and opening the switching element 17 via a control line 28, which leads to the energy supply, in particular the fuel cell unit and/or an energy store being disconnected, ensuring that the safety of persons and the surroundings is protected.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A device for generating energy and distributing electrical energy to a plurality of electrical loads, said device comprising:
   a distributor unit containing a plurality of distributor connector part halves;
   a plurality of pairs of lines for connecting said plurality of electrical loads to said plurality of connector part halves wherein said lines have respective first line and second line connector part halves arranged at a respective first distributor unit end and load end of said lines, wherein said second line connector part halves arranged at the load end of said lines are connected to respective connector load part halves of said plurality of loads;
   a diagnostic circuit having a line section wherein said line section is at least one of open and closed by line bridges of said first line and second line respective connector part halves arranged on said respective pairs of plurality of lines;
   a switching device actuated by a control unit wherein said switching device is arranged between an energy-generating unit and said distributor unit; and
   a signal generator and an evaluation unit functioning in association with said diagnostic circuit, wherein a diagnostic signal ($u_1$, $u_2$) is fed into the diagnostic circuit and at least one of a measured and calculated value of the diagnostic signal ($y_1$, $y_2$) is determined by the evaluation until, and wherein a fault state is diagnosed if a deviation of a determined value of the diagnostic signal ($y_1$, $y_2$) from the original diagnostic signal ($u_1$, $u_2$) exceeds a predefined tolerance threshold, and wherein a fault state is diagnosed if the diagnostic signal ($y_1$, $y_2$) does not change sign in a specific time interval.

2. The device according to claim 1, wherein the signal generator is a generator for at least one of an encoded and pulse-width-modulated signal ($u_1$, $u_2$).

3. The device according to claim 1, wherein the energy-generating unit is a fuel cell unit.

4. The device according to claim 1, wherein one of said plurality of electrical loads is an electrical machine with drive electronics.

5. A method for monitoring the device constructed according to claim 1, wherein, when a fault state occurs, the switching device is actuated and the distributor unit is separated from the energy-generating unit.

6. A method for monitoring the device constructed acording to claim 1, wherein, when a fault state occurs, the switching device is actuated and the distributor unit is separated from the energy-generating unit.

7. The device according to claim 2, wherein the energy-generating unit is a fuel cell unit.

8. The device according to claim 2, wherein one of said plurality of electrical loads is an electrical machine with drive electronics.

9. The device according to claim 3, wherein one of said plurality of electrical loads is an electrical machine with drive electronics.

10. A method for monitoring a device constructed according to claim 2, wherein a diagnostic signal ($u_1$, $u_2$) is fed into the diagnostic circuit and at least one of a measured and calculated value of the diagnostic signal ($y_1$, $y_2$) is determined by the evaluation until, and wherein a fault state is diagnosed if a deviation of a determined value of the diagnostic signal ($y_1$, $y_2$) from the original diagnostic signal ($u_1$, $u_2$) exceeds a predefined tolerance threshold.

11. A method for monitoring a device constructed according to claim 3, wherein a diagnostic signal ($u_1$, $u_2$) is fed into the diagnostic circuit and at least one of a measured and calculated value of the diagnostic signal ($y_1$, $y_2$) is determined by the evaluation until, and wherein a fault state is diagnosed if a deviation of a determined value of the diagnostic signal ($y_1$, $y_2$) from the original diagnostic signal ($u_1$, $u_2$) exceeds a predefined tolerance threshold.

12. A method for monitoring a device constructed according to claim 4, wherein a diagnostic signal ($u_1$, $u_2$) is fed into the diagnostic circuit and at least one of a measured and calculated value of the diagnostic signal ($y_1$, $y_2$) is determined by the evaluation until, and wherein a fault state is diagnosed if a deviation of a determined value of the diagnostic signal ($y_1$, $y_2$) from the original diagnostic signal ($u_1$, $u_2$) exceeds a predefined tolerance threshold.

* * * * *